Sept. 1, 1953 — O. J. POUPITCH — 2,650,516
DASH LINER CLIP
Filed Feb. 1, 1950
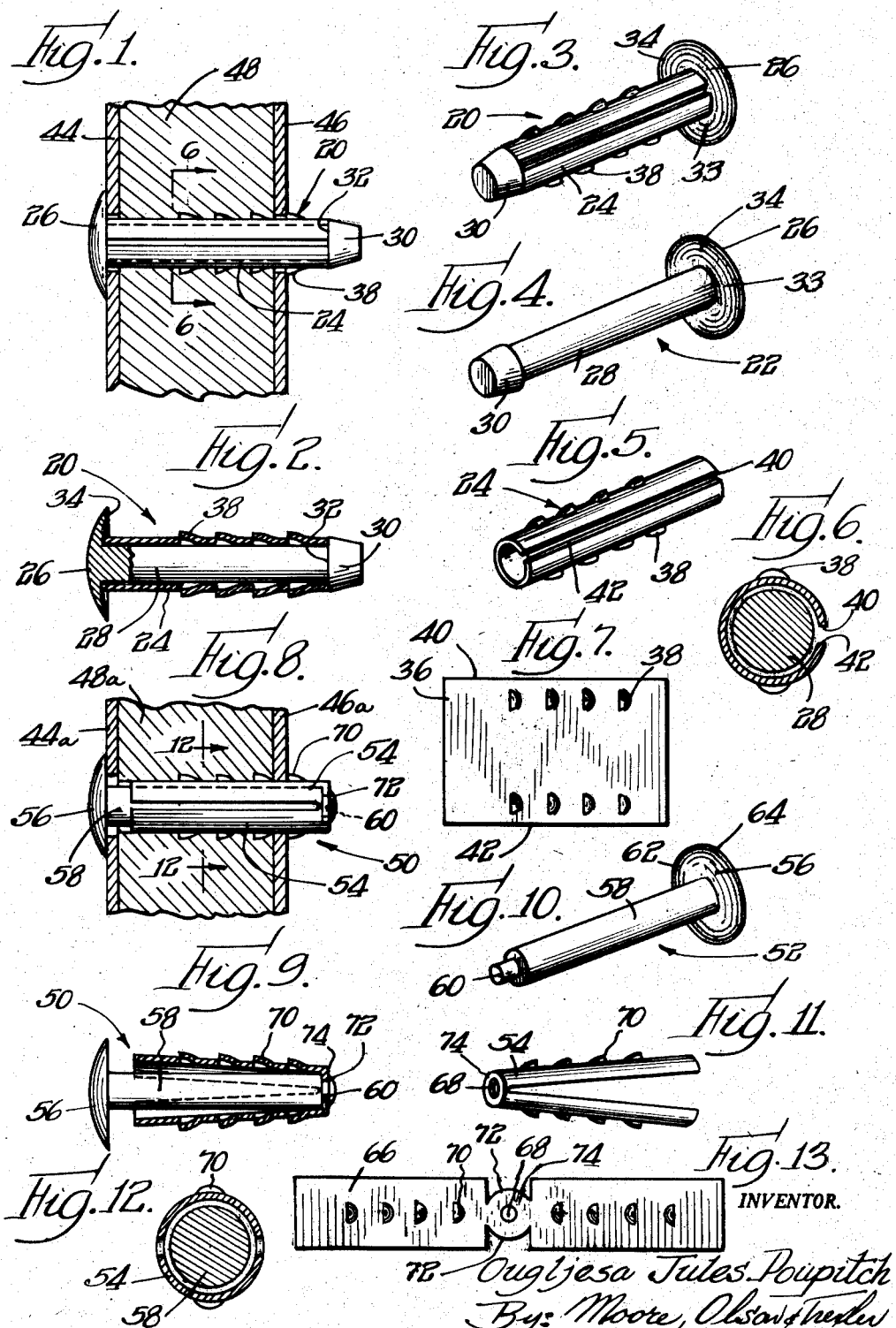
INVENTOR.
Ougljesa Jules Poupitch
By: Moore, Olson & Trexler
attys.

Patented Sept. 1, 1953

2,650,516

UNITED STATES PATENT OFFICE 2,650,516

DASH LINER CLIP

Ougljesa Jules Poupitch, Chicago, Ill., assignor to Illinois Tool Works, Chicago, Ill., a corporation of Illinois Application February 1, 1950, Serial No. 141,713

3 Claims. (Cl. 85—5)

This invention relates to fastening devices and more particularly to fastening units adapted to be forcibly driven into apertures in work pieces with a hammer or similar tool.

In certain applications it is desirable to hold in assembled relationship a series of work pieces certain of which are made of relatively rigid materials and certain of which are made of relatively compressible materials. An example of such an installation is the construction in automobiles in which articles are secured to the floor or dash panels of the vehicle by fasteners customarily referred to as "dash liner clips." In this latter application it is desirable to insure that the interior of the vehicle is kept as clean as possible and more particularly it is necessary to prevent particles of dirt, oil and the like from penetrating the work pieces through the fastener receiving apertures therein. Since the floor and dash panels of the vehicle are visible to the occupants, the exposed portions of the dash liner clip should be decorative.

Accordingly, it is an object of the present invention to provide an improved dash liner clip which insures a tight seal of the work aperture.

Another object is to provide a two piece dash liner clip having a sealing head and work piece engaging means adapted to be tensioned transversely by the wall of the work aperture during insertion therein.

A further object is to provide an improved sealing dash liner clip of the type described in which the sealing head possesses great strength and is highly decorative.

Still another object is to provide an improved fastener of the type described which is capable of withstanding relatively great shear forces.

A still further object is to provide a fastener of the type described which is readily assembled and is simple and economical to fabricate.

These and other objects of the invention will be more apparent upon perusal of the following description when taken in connection with the accompanying drawings wherein:

Figure 1 is a cross sectional view through a work piece showing in elevation a dash liner clip mounted therein, the dash liner clip being constructed in accordance with and embodying the principles of the invention;

Figure 2 is a side view of the dash liner clip illustrated in Figure 1 with certain portions shown in vertical cross section;

Figure 3 is a perspective view of the dash liner clip of Figure 1;

Figure 4 is a perspective view of the stud member of the dash liner clip shown in Figure 1;

Figure 5 is a perspective view of the sleeve of the dash liner clip shown in Figure 1;

Figure 6 is an enlarged vertical cross-sectional view substantially as seen in the direction of arrows along the line 6—6 in Figure 1;

Figure 7 is a plan view of the blank from which the sleeve of Figure 5 is formed;

Figure 8 is a vertical cross-sectional view through a work piece showing a dash liner clip mounted therein, the dash liner clip being formed in accordance with another embodiment of the present invention;

Figure 9 is a side view of the dash liner clip of Figure 8 with the sleeve thereof shown in cross section;

Figure 10 is a perspective view of the stud member of the dash liner clip shown in Figure 8 before assembly with the sleeve;

Figure 11 is a perspective view of the sleeve which forms a part of the dash liner clip of Figure 8;

Figure 12 is an enlarged vertical cross-sectional view substantially as seen in the directions of the arrow along the line 12—12 in Figure 8; and Figure 13 is a plan view of the blank from which the sleeve of Figure 11 is formed.

Referring to Figs. 1 through 7 there is shown a dash liner clip 20 made in accordance with and embodying the principles of the present invention. Dash liner clip 20 comprises a stud member 22 and a sleeve member 24, the sleeve member 24 being loosely fitted upon stud member 22. As may be best seen in Fig. 4, the stud member 22 comprises a head 26 formed on one end of a cylindrical shank 28. The other end 30 of shank 28 is enlarged to form a shoulder 32 which aids in retaining sleeve 24 in position upon shank 28. End 30 is formed like a truncated cone, the base of the cone being turned toward head 26 and the smaller portion of the cone pointing away from head 26. To give improved sealing when the dash liner clip is in position head 26 is recessed as at 33 to form a sealing rim 34 on the outer circumference of the circular head 26.

Referring now to Fig. 7, there is shown the blank 36 from which the sleeve 24 is fabricated. A set of protuberances or teeth 38 is formed on each longitudinally extending edge of blank 36 preferably by extruding the material from the body of blank 36 outwardly to produce a section of the shape shown in Fig. 2. The teeth 38 are preferably extruded when blank 36 is formed but it is to be understood that they may be formed either before or after formation of blank 36. Two rows containing four teeth each have been shown on blank 36 but any number of rows containing any desired number of teeth may be used. After forming blank 36 as shown in Fig. 7, the blank is rolled into tubular form as seen in Fig. 5 to provide in effect a split cylinder.

Sleeve 24 and stud member 22 are assembled to form a fastener unit by forcing end 30 through the aperture formed in sleeve 24. Sleeve 24 possesses sufficient resiliency to allow the sides thereof to be moved radially outwardly whereby to permit end 30 of stud member 22 to be inserted therein. The length of sleeve 24 is such that it fits between head 26 and shoulder 32. It will be seen therefore, that after end 30 passes through sleeve 24 the sleeve will snap resiliently inwardly whereby to encircle shank 28. The diameter of sleeve 24 is slightly greater than the diameter of shank 28 and the longitudinally extending edges 40 and 42 of sleeve 24 are slightly spaced apart whereby to allow the sleeve to be compressed radially inwardly for a purpose to be presently explained. The assembled dash liner clip can be best seen in Figs. 2 and 3.

The stud member 22 may be formed from a suitable metal or a plastic depending upon the proposed application of the finished fastener. Any material of construction may be used which produces a stud whose head gives good sealing, is decorative, and whose shank is relatively strong whereby to withstand high shear forces. The sleeve 24 is preferably formed from sheet metal in any suitable manner but other desired materials may be used.

Fig. 1 illustrates one important application of the dash liner clip 20 made in accordance with the present invention. There is shown a typical floor or dash panel installation in automobiles in which there are secured together alternate layers or panels of rigid materials such as the panels 44 and 46 and the intervening compressible material 48. The function of the dash liner clip is to hold these materials in compressed assembled relationship in such a manner as to insure that the interior of the vehicle is kept as clean as possible. More particularly it is desirable to prevent particles of dirt, oil and the like from penetrating the assembly of work pieces especially through the dash liner clip aperture.

To install the dash liner clip 20, the assembled clip is positioned with end 30 in the aperture in panel 44 and then a blow or a series of blows is directed against head 26 thereby to drive the clip to the position shown in Fig. 1. Preferably the clip is of sufficient length so that the end 30 protrudes from the panel 46 when head 26 is seated on panel 44. The teeth 38 are adapted selectively to engage the outer surface of panel 46, the particular teeth engaging panel 46 depending upon the thickness of the work piece assembly. During insertion of sleeve 24 and shank 28 through the work pieces, sleeve 24 will be compressed radially inwardly whereby to move the teeth 38 inwardly to allow their passage through the apertures in the work pieces. The compressible material 48 yields sufficiently to insure selective engagement of an appropriate set of teeth 38 after the fastener head 26 engages the outer side of panel 44. When panel 46 rests between two sets of teeth as shown in Fig. 1, sleeve 24 will move outwardly radially whereby to cause the rear edge of teeth 38 to engage the outer side of panel 46 as explained above. The diameter of sleeve 24 is made greater than the diameter of shank 28 to enable the sleeve to undergo this deformation during insertion in the work piece.

The sealing surface 34 of head 26 completely surrounds the aperture in panel 44 and thereby prevents the movement of dirt, oil and the like from the outer side of panel 46 through the apertures in panels 44, 46 and 48 and then to the outer side of panel 44. This sealing effect of head 26 is important since the exposed side of panel 44 is on the inside of automobiles and is in view of and in contact with the occupants. The recess 33 around shank 28 in head 26 eliminates the possibility that imperfections in the junction of shank 28 and head 26 will hold the head away from the outer surface of panel 44.

It will be understood, however, that the dash liner clip is not limited to the use described above and may be employed in other applications, as for example, securing objects to plastic supporting bodies wherein the fastener is inserted in a blind hole to be retained therein solely by thhe gripping action of teeth 38 on the wall of the aperture. The above described fastener has a wide variety of uses and is highly dependable in service. It is quickly and easily manufactured and assembled and is easily applied to the work piece assembly. Once inserted in the work piece assembly the dash liner clip locks itself in position and cannot be removed without application of considerable force thereto. When in position, the dash liner clip effectively seals the apertures in the work piece and presents a decorative appearance.

In Figs. 8–13 there is illustrated a second embodiment of a dash liner clip made in accordance with the present invention. This form of dash liner clip generally designated by the numeral 50 comprises a stud 52 and a sleeve member 54, the sleeve member 54 being firmly attached to stud member 52 in a manner to be described later. Referring to Fig. 10, there is shown a stud member which is used in the second embodiment of the invention before assembly with sleeve 54. The stud member 52 includes a circular rounded head 56, a cylindrical shank 58, and a sleeve receiving end member 60. Head 56 is preferably recessed as at 62 in the same manner and for the same reasons that head 26 was recessed at 33. By recessing head at 62, a sealing rim 64 is formed which completely encircles the circumference of head 56.

There is shown in Fig. 13 a blank 66 from which the sleeve member 54 is formed. Blank 66 is rectangular in shape and is provided with an opening 68 in the center thereof which is adapted to receive the end 60 of stud member 52. A series of teeth 70 are struck from the body of blank 66 to form work piece engaging means on the assembled fastener. The teeth 70 are preferably equally spaced from aperture 68 so that when blank 66 is folded to the position shown in Fig. 11 the two series of work engaging teeth are aligned. Blank 66 is recessed near the mid-portion thereof as at 72 whereby to form a circular end 74 for the finished sleeve member 54. The blank shown in Fig. 13 is preferably formed by stamping or similar suitable means of fabrication, during which stamping or fabrication step the aperture 68, the teeth 70, and the recesses 72 are formed.

After blank 66 has been folded to form the sleeve 54 shown in Fig. 11, sleeve 54 is assembled with stud member 52. To assemble these members, the end 60 of stud member 52 is inserted through aperture 68 and then end 60 is peened over as at 72 whereby to permanently affix sleeve member 54 to stud member 52.

Dash liner clip 50 is applied to work pieces in the same manner as is dash liner clip 20. Folded sleeve 54 can be compressibly deformed radially inwardly whereby to allow the teeth 70 to pass through the apertures in the work piece 44a, 46a and 48a. After a suitable number of the teeth 70 have passed through panel 46a, the resiliency of sleeve 54 will cause the sleeve to expand radially, whereby to move teeth 70 into engaging relationship with the outer surface of panel 46a.

It will be seen that dash liner clip 50 will effectively seal the apertures in the work panels and will present a decorative appearance when viewed from the outer side of panel 44a. The stud 52 may be made of a suitable metal or plastic whereby to give relatively high shear strength to the finished fastener.

Although certain preferred embodiments of the invention have been shown for purposes of illustration, it is to be understood that various changes and modifications can be made without departing from the spirit of the invention. The invention is accordingly not to be limited to the specific embodiments shown and described, but only as indicated in the following claims.

I claim:

1. A two-piece fastener unit for securing a plurality of apertured work pieces together comprising a solid stud element and a resilient sleeve member in the form of a split cylinder, said stud including a shank, a head adjacent one end of said shank for engaging one surface of a complementary apertured work piece, an enlargement in the vicinity of the entering end of said shank providing a shoulder spaced axially from said head, said sleeve loosely encircling said shank and secured against longitudinal movement relative thereto by abutment with the head at one extremity and abutment with said shoulder at the other extremity, and a plurality of rigid longitudinally spaced struck-out shoulders extending radially outwardly with respect to the periphery of said sleeve member, said sleeve member being resiliently collapsible toward said shank as an incident to initial insertion thereof within a work aperture and being adapted to expand radially outwardly after continued insertion whereby to cause a protuberance and said sleeve body to be moved into engaging relationship with the side of a work piece oppositely disposed from the stud head and the wall defining the aperture in said work piece.

2. A fastener unit of the type defined by claim 1 wherein said shank is provided with a solid tapered entering end to facilitate insertion of the fastener unit into the aperture of the work piece.

3. A fastener of the type defined by claim 1 wherein said longitudinally spaced rigid shoulders are provided in series at substantially diametrically opposite positions on the periphery of said sleeve member.

OUGLJESA JULES POUPITCH.

References Cited in the file of this patent

UNITED STATES PATENTS

| Number | Name | Date |
|---|---|---|
| 861,562 | Wade | July 30, 1907 |
| 1,335,756 | Scarff | Apr. 6, 1920 |
| 1,483,218 | Fahnestock | Feb. 12, 1924 |
| 1,523,116 | Goodwin | Jan. 13, 1925 |
| 1,976,198 | Steenrod | Oct. 9, 1934 |
| 2,076,043 | Ryder | Apr. 6, 1937 |
| 2,156,003 | Tinnerman | Apr. 25, 1939 |
| 2,179,604 | Tinnerman | Nov. 14, 1939 |
| 2,523,239 | Tinnerman | Sept. 19, 1950 |